Sept. 16, 1958  HARUICHI NAKAMURA  2,851,908
CONTINUOUS ROTATION CONVERTING METHOD
Filed March 30, 1953
FIG. III
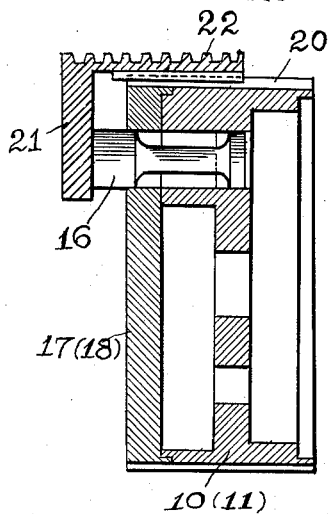
FIG. II
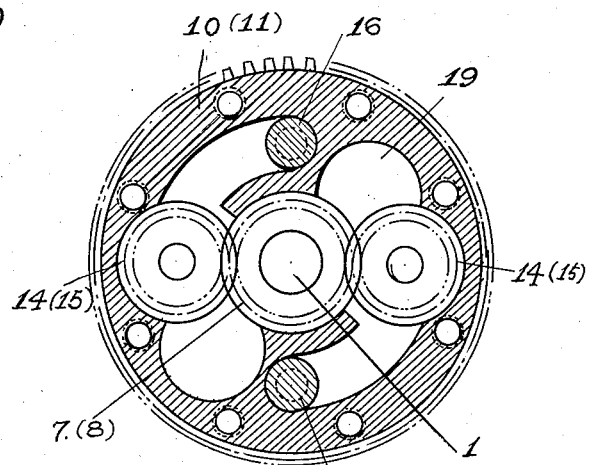
FIG. I
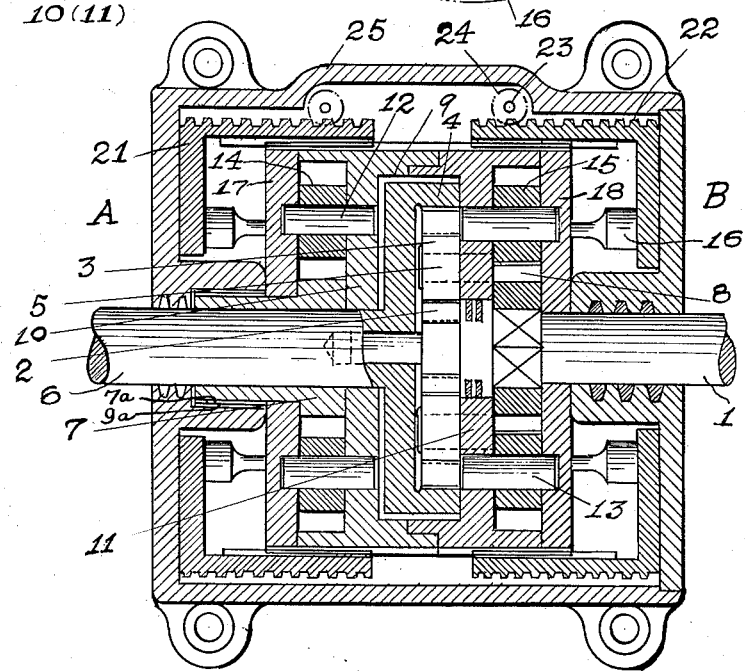
INVENTOR.
HARUICHI NAKAMURA
BY Linton and Linton
ATTORNEYS.

United States Patent Office 2,851,908
Patented Sept. 16, 1958

2,851,908

CONTINUOUS ROTATION CONVERTING METHOD

Haruichi Nakamura, Chiba, Japan

Application March 30, 1953, Serial No. 345,290

1 Claim. (Cl. 74—791)

This invention relates to a continuous converting device and is characterized in that velocity change, change of rotational direction and the stoppage of the rotation of the follower shaft can easily be obtained by changing the brake effect of the planetary gear train which is arranged in such a way as to transmit the rotational motion of the drive shaft to the follower shaft by the planetary gear train.

The object of this invention consist in obtaining the continuous change of the speed of the follower shaft to the drive shaft with its required torque. In the attached figures one example is shown.

Figure I is the side view showing a longitudinal section of the invention.

Figure II is a cross sectional view of Figure I.

Figure III is a longitudinal section showing the construction of the gear pump of this invention.

Referring now more in detail to the accompanying drawings. 1 is the driving shaft, 2 is the driving gear wheel fixedly connected to said shaft, 3 is a planetary gear wheel which meshes with the driving gear wheel 2 and the follower gear wheel 4 and is rotatably mounted on its shaft 5. A is the gear pump mounted on the follower shaft 6 and includes gear wheel 7 which is mounted freely on said follower shaft 6 and fixedly connected to housing 25. B is the gear pump mounted on the driving shaft and has the gear wheel 8 which is fixed to the driving shaft 1. Both "A" and "B" are formed as one body by the pump case 9.

The gear wheel shaft 12 of the "A" pump and the gear wheel shaft 13 of the "B" pump are respectively fixed to the inner wall 10, 11 of said pump case 9. The idle gear wheel 14 which is meshed with the fixed gear wheel of the "A" pump is freely mounted on the gear wheel shaft 12. The idle gear wheel 15 which is meshed with the gear wheel 8 which is fixed to the driving gear shaft of the "B" pump is freely mounted on the gear wheel shaft 13. The outer surfaces of the idle gear wheels 14, 15 are in air tight contact with the pump case 9 and their inner surfaces mesh the said gear wheels 7 and 8. The outer surfaces of the gear wheels 7, 8 are so formed as to contact the pump case 9 in an air tight fit, except the parts meshing with the idle gear wheels 14, 15. Gear wheel 7 also has gear teeth 7a meshing wtih gear teeth 9a of said pump casing 9.

As shown in Figure III, the oil regulator valves 16 which open or close the oil circuit of these pumps are arranged between the inner walls 10, 11 and the outer walls 17, 18 of the pump frame 9, and the oil suction hole 19 is arranged on the outer wall 17, 18. The spline keys 20 are formed on the outer surface of the pump case 9 and mesh with the spline key of the connecting case 21 which is slidable in the axial direction of the driver and the follower shafts and is connected to the oil regulating valve 16. The screw 22 formed as endless toothlike extruded parts are worked out on the outer surface of the said connecting case 9 and mesh with the pinion 24 which rotatable by the shaft 23 which is operable from the outerside of the machine frame. The parts denoted by number smaller than 20 are commonly used to the pump A and B and each of them is independently operable and these mechanisms are encased in the oil bath 25 which serves also as a machine frame.

The working of this apparatus is as follows: Assuming that the rotating torque acts on the driving shaft when the same constant load acts on the follower shaft and the oil circuit of both pumps A and B is opened from the pump case 9, the rotating torque transmitted from the driving gear wheel 2 rotates the planetary gear wheel 3 about its shaft 5 and lets the pump case 9 return to the revolving direction of the driving gear wheel before the inner gear wheel 4 which is fixed to the follower shaft rotates. Thus the rotating torque is not transmitted to the follower shaft and rotates only the pump case 9. When the oil circuit of the "A" pump is caused to close gradually the oil pressure on the discharge side of the oil circuit of the gear pump is upraised gradually and the idle gear wheel 14 of the gear pump A is restricted from rotation by the fixed gear wheel 7 and the pump case 9 becomes fixed. Then as the shaft 5 of the planetary gear wheel 3 is fixed to the pump case 9 the rotating force by the driving gear 2 produces the reverse rotating force to the inner gear wheel 4. When the oil circuit of the "B" pump is closed and the oil circuit of the "A" pump is opened, the pump case 9 is rotated in the same direction of the driving shaft under the influence of the gear wheel 8 which is fixed to the driving shaft. The reason why is the same as above explained. Then the oil circuit of the "A" pump is opened and there is no resistance produced by the discharge oil of the fixed gear wheel 7 therefore the rotation of the pump case 9 is not prohibited.

Therefore when the oil circuit of the "A" pump is closed and the oil circuit of the "B" pump is opened the follower shaft rotates in the reverse direction of the driving shaft. In the reverse case, the rotational direction of the follower shaft is reversed. Accordingly the opening and closing of the oil regulating valve 16 produces the variation of the rotation of the follower shaft.

As for the rotating torque, when the constant load is applied on the follower shaft and the oil regulating valve 16 is closed gradually, the oil pressure of the discharge side of the gear pump is gradually raised up and finally attains a pressure sufficient to overcome the loading torque and begins to rotate. It can respond to the instability of the torque of the follower, because even in the extent of opening of the valve 16 now stated, the required torque can be transmitted, the smaller torque of course can surely be transmitted and now it is necessary to consider the larger torque.

That is to say, the rotation of said shaft is decreased by the increase of the torque of the follower and it follows the revolutional variation of the pump case 9 and consequently increases the discharge quantity of the pumps "A" and "B" and increases the fluid resistance and responds to the increased requirement of the transmitting torque of the follower shaft. But in this case, as the increase of the transmitting torque comes from the decrease of the revolution of the follower, in order to obtain the required revolution, it is necessary to increase further the closure of the valve 16. We now explain the regulating feature of the oil regulating valve in the gear pump.

As the pinion 24 which meshes with the endless screw 22 moves the connecting frame 21 in the axial direction by operating the shaft 23 which extends to the outside of the machine frame, it follows that the valve 16 is moved in the axial direction and regulation can be obtained.

In this case, the spline key 20 which is formed on the surrounding outer surface of the pump case 9 mesh with the inner side of the connecting frame 21 and causes the circumferential rotation of the pump case 9. Consequently we can regulate without any force applied to the side surface of the regulating valve 16.

In this apparatus the working oil is filled in the machine frame 25 which has enough surface to cool down working oil and has all the mechanism in it.

The merits of this invention can be enumerated as follows:

I can obtain the normal revolution, stoppage, reverse rotation and the continuous speed variation by the simple operation of the shaft in keeping the rotational direction and the number of revolutions of the driving shaft at the constant value. It can respond to the unstable torque of the follower with no mechanical shock and breakage. A lessening of speed can also be obtained. As the torque is transmitted only by the spur gear wheel the transmitting efficiency is very high and there is no working loss caused by the temperature variation.

Having thus described the invention, what is claimed and desired to be secured by Letters Patent is:

A device for continuously regulating a follower shaft relative to its driving shaft comprising a driving shaft, a driven shaft, a casing rotatably mounted on and having said shafts extending therefrom, a plurality of walls in said casing dividing the same into three fluid tight compartments, a driving gear fixedly connected to said driving shaft and positioned in one of said compartments, a first set of planetary gears rotatably supported by one of said walls within said compartment and meshing with said driving gear, a driven gear fixedly connected to said driven shaft within said compartment and meshing with said planetary gears, a second driving gear fixedly connected to said driving shaft within a second of said compartments, a second set of planetary gears rotatably supported by some of said walls within said second compartment and meshing with said second driving gear forming a fluid pump therewith, a third set of planetary gears rotatably supported by others of said walls within a third of said compartments, said casing having openings in said walls, piston valves slidably mounted through said wall openings controlling the flow of fluid into and from said second and third compartments, means controlling the movement of said piston consisting of slides fixedly connected to said pistons exteriorly of said casing and having splines on one face, said casing having splines slidably receiving said slide splines for slidably supporting said slide for movement longitudinally of said pistons, teeth provided on an opposite face of said slides, gears meshing with said slide teeth for moving the same, a fixed fluid containing housing enclosing said casing and said controlling means with said shafts extending outwardly of said housing, a gear rotatably supported by said driven shaft within said third compartment meshing with said third set of planetary gears forming a fluid pump therewith and fixedly connected to said housing, control shafts extending through said housing and connected to said controlling means gears for operating said controlling means.

References Cited in the file of this patent

UNITED STATES PATENTS

| 1,378,184 | Newton | May 17, 1921 |
| 2,177,302 | Lawrence | Oct. 24, 1939 |
| 2,198,398 | Szekely | Apr. 23, 1940 |
| 2,327,238 | Baggott | Aug. 17, 1943 |
| 2,354,597 | Jandasek | July 25, 1944 |
| 2,390,240 | De Lancey | Dec. 4, 1945 |

FOREIGN PATENTS

| 947,935 | France | July 18, 1949 |